United States Patent [19]
Adat et al.

[11] Patent Number: 5,624,158
[45] Date of Patent: *Apr. 29, 1997

[54] ADJUSTABLE BACKREST

[75] Inventors: Riyaz Adat, Don Mills; Kevin Mar, Toronto; Craig Pirie, Etobicoke; Tim Poupore, Toronto, all of Canada

[73] Assignee: Bosaro Biotech Inc., Scarborough, Canada

[*] Notice: The term of this patent shall not extend beyond the expiration date of Pat. No. 5,344,211.

[21] Appl. No.: 591,430

[22] PCT Filed: Aug. 5, 1994

[86] PCT No.: PCT/CA94/00428

§ 371 Date: Jan. 22, 1996

§ 102(e) Date: Jan. 22, 1996

[87] PCT Pub. No.: WO95/04488

PCT Pub. Date: Feb. 16, 1995

[30] Foreign Application Priority Data

Mar. 31, 1994 [CA] Canada ................... 2120456

[51] Int. Cl.⁶ .................................... A47C 7/46
[52] U.S. Cl. .................. 297/230.14; 297/284.4; 297/284.7
[58] Field of Search ............. 297/230.14, 284.1, 297/284.4, 284.5, 284.7, 284.9

[56] References Cited

U.S. PATENT DOCUMENTS

| | | | |
|---|---|---|---|
| D. 214,119 | 5/1969 | Worley | D6/502 |
| D. 345,477 | 3/1994 | Infanti | D6/502 |
| D. 345,478 | 3/1994 | Infanti | D6/502 |
| D. 358,515 | 5/1995 | Adat et al. | D6/502 |
| 2,756,809 | 7/1956 | Endresen | 297/284.4 |
| 2,843,195 | 7/1958 | Darvaeus . | |
| 3,112,137 | 11/1963 | Drenth | 297/284.3 |
| 3,241,879 | 3/1966 | Castello et al. . | |
| 3,608,960 | 9/1971 | Sherman | 297/284.9 |
| 3,762,769 | 10/1973 | Poschl . | |
| 4,153,293 | 5/1979 | Sheldon | 297/284.4 |
| 4,321,044 | 3/1982 | Kron | 297/284.9 |
| 4,452,458 | 6/1984 | Schueter . | |
| 4,502,728 | 3/1985 | Sheldon et al. | 297/230.14 X |
| 4,535,495 | 8/1985 | Oldfield | 297/230.12 X |
| 4,541,670 | 9/1985 | Morgenstern et al. . | |
| 4,601,514 | 7/1986 | Meiller . | |
| 4,632,454 | 12/1986 | Neart . | |
| 4,647,066 | 3/1987 | Walton . | |
| 4,722,569 | 2/1988 | Morgenstern et al. . | |
| 4,909,568 | 3/1990 | Dal Monte . | |
| 4,915,448 | 4/1990 | Morgenstern . | |
| 4,965,093 | 10/1990 | Dal Monte | 297/284.4 |
| 4,981,325 | 1/1991 | Zacharkow . | |
| 4,993,164 | 2/1991 | Jacobsen | 297/284.4 X |
| 5,026,116 | 6/1991 | Dal Monte . | |
| 5,050,930 | 9/1991 | Schuster | 297/284.4 |
| 5,112,106 | 5/1992 | Ashjornsen . | |
| 5,197,780 | 3/1993 | Coughlin . | |
| 5,228,747 | 7/1993 | Greene . | |
| 5,286,083 | 2/1994 | Mattison | 297/230.12 |
| 5,314,235 | 5/1994 | Johnson | 297/284.5 |
| 5,344,211 | 9/1994 | Adat et al. | 297/230.14 |

FOREIGN PATENT DOCUMENTS

A10291298  11/1988  European Pat. Off. .

Primary Examiner—Peter R. Brown
Attorney, Agent, or Firm—Sim & McBurney

[57] ABSTRACT

An adjustable backrest for supporting a human back comprising a straight spine member; a lumbar support member projecting from the straight spine member; an upper back support member projecting from the straight spine member adjacent the lumbar support member; a back pad resting on the lumbar support member and the upper back support member for supporting the human back. Structure is provided for adjusting curvature of the lumber support member and for adjusting curvature of the upper back support member to accommodate different shapes of the human back, as well as for providing side-to-side mobility of the back pad to accommodate twisting movement of the human back.

10 Claims, 15 Drawing Sheets

ADJUSTABLE BACKREST

FIELD OF THE INVENTION

The present invention relates in general to backrests, and more particularly an adjustable backrest having independent adjustment of lumbar and upper back height and curvature, as well as overall height adjustment to fit different size patients.

BACKGROUND OF THE INVENTION

Adjustable backrests or supports are well known in the art. U.S. Pat. No. 5,112,106 (Asbjornsen et al) discloses a backrest comprising a central spine or rail to which a lumbar support cushion and head cushion are connected via a sliding element. The sliding element is connected to the rail or spine via a ratchet-like connection. The '106 Patent is of interest for teaching the concept of height adjustable lumbar support where the adjusting means is connected to a spine for sliding engagement therewith.

U.S. Pat. No. 2,756,809 (Endresen) discloses a back support comprising a metal sheet with adjustable lumbar and upper-back portions. A screw adjusts the concavity of the upper-back portion while a further screw adjusts the convexity of the lumbar support portion. A pair of cross bars are provided for supporting and securing the lumbar and upper back portions of the sheet to the backrest. The two adjustment screws are mounted on a pair of sliding plates to provide vertical adjustment of the lumbar support area and the upper-back support area. Accordingly, this patent is of interest for teaching independent height and curvature adjustment of the lumbar support and upper-back support portions of a backrest.

Additional references are known which pertain to adjustable back support or backrests, as follows: U.S. Pat. Nos. 2,843,195; 3,241,879; 3,762,769; 4,153,293; 4,452,458; 4,541,670; 4,601,514; 4,632,454; 4,722,569; 4,909,568; 4,915,448; 4,968,093; 5,026,116; and 5,197,780, as well international patent application No. PCT/AU91/00487 (BackCare and Seating Pty. Ltd.).

While the known prior art backrests disclose the provision of lumbar and upper-back support members with independently adjustable curvature and positioning, none of the known prior art teaches the combination of height adjustment, lumbar height, curvature and position adjustment and side-to-side mobility. Nor does the prior art teach this combination with upper back curvature adjustment. The provision of these features in a backrest is important to ensure proper fitting of the backrest for adult bodies of different height and shapes. Furthermore, human beings tend not to be static but like to move or "fine tune" their sitting positions. The known prior art backrests do not provide adequate side-to-side mobility for such movement. Nor do they allow for the convenient minor adjustment of support. In addition, the known prior art back supports are generally bulky or heavy to carry and occupy excessive space at the bottom portions thereof, thereby leaving very little room to sit on a chair.

SUMMARY OF THE INVENTION

According to the present invention, a backrest is provided in which lumbar height and curvature adjustment are provided along with overall height adjustment to fit different sized persons. Side-to-side mobility is provided to accommodate twisting movements of the human back which are common when a person is sitting (e.g. turning to reach something, or "fine tuning" of one's sitting position). Furthermore, according to the backrest of the present invention a slight hollow is provided just above the base of the backrest to allow for curvature and space so that the backrest does not occupy excessive space on a chair. Additionally, in one embodiment upper-back curvature and height adjustment are provided along with side adjustment to suit each half side of the human back (i.e. for accommodating different torso shapes).

DETAILED DESCRIPTION OF THE PREFERRED AND ALTERNATIVE EMBODIMENTS

Figure 1:
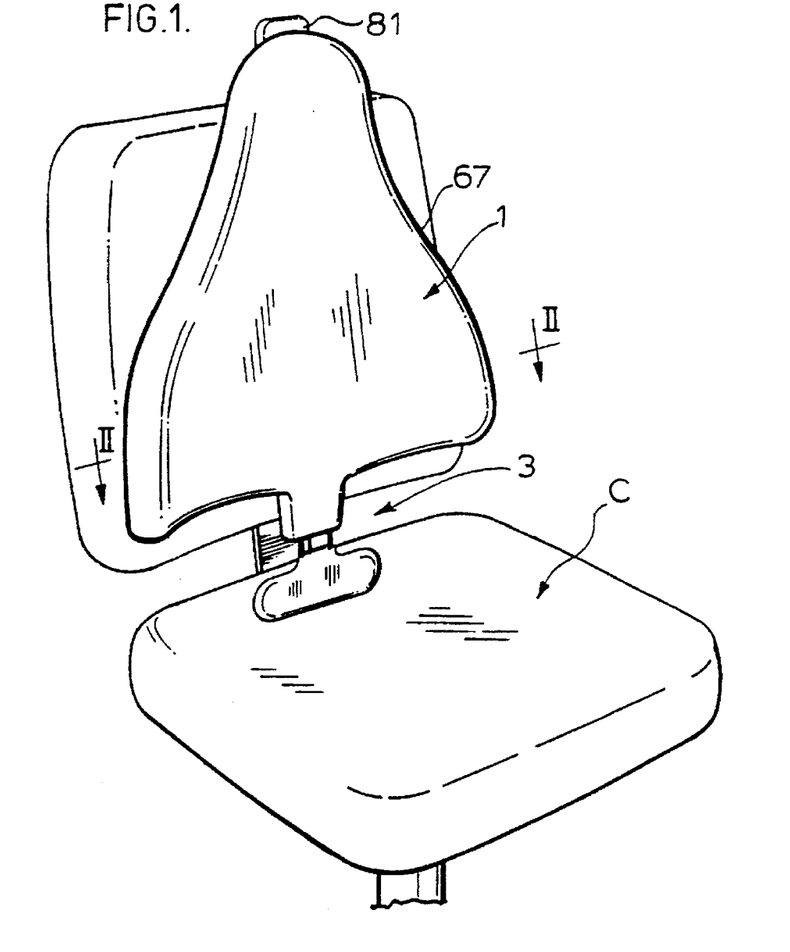
FIG. 1 is a perspective view of the backrest according to a first embodiment of the present invention resting on a chair.

Turning first to FIG. 1, the backrest of the present invention is shown according to a first embodiment comprising a generally triangular upper portion 1 and base portion 3 resting on the seat of chair C. The triangular profile of upper portion 1 facilitates side-to-side movement of a person using the backrest of the present invention. Also, the hollow portion between the portion 1 and base portion 3 ensures that the backrest does not occupy excessive space on the chair C.

Turning to the remaining FIGS. 2–6, the details of construction of the first embodiment are illustrated. A spine 5, preferably of rigid aluminum, forms a central support portion of the backrest to which all other parts are attached. The spine 5 is fabricated to form a pair of cylindrical channels 7 and 9 intermediate a groove 11. As will be discussed in greater detail below, the spine 5 also includes a plurality of slots and apertures for the connection and securing of the various other parts.

A lumbar spring 13 has a projection 15 from a bottom end thereof which is shaped so as to be received in a clip 17. The clip 17 is riveted into spine 5 via a rivet 19 or other suitable attachment means. Thus, the lower portion of lumbar spring 13 is rigidly connected to the spine 5. As will be discussed in greater detail below, an upper portion of the lumbar spring 13 contains a projection 21 which is adapted to slide within the groove 11 of the spine 5 to permit curvature adjustment of the lumbar spring 13.

A cross bar 23 is provided in the form of a flat piece of metal (e.g. steel) which in conjunction with the back pad 49 and lateral adjustment straps 51 and 53 (discussed below), contributes to side-to-side lateral support of the backrest. The cross bar 23 is attached to back pad 4a as discussed in greater detail below.

An adjustment strap 25 is provided with a clip 27 at one looped end thereof and a D-ring 29 at an opposite looped end thereof. The end with clip 27 is dimensioned to pass through an aperture 31 in the spine of 5 as shown by the arrow in FIG. 6 such that the clip 27 may be secured to one of a plurality of slots 33 in the spine.

At the other end, the projection 21 of lumbar spring 13 is dimensioned to pass through D-ring 29 which remains on an opposite side of the spine 5 from the clip 27 and is adapted to slide within the groove 11 thereof, as will be discussed in greater detail below.

Figure 4A:
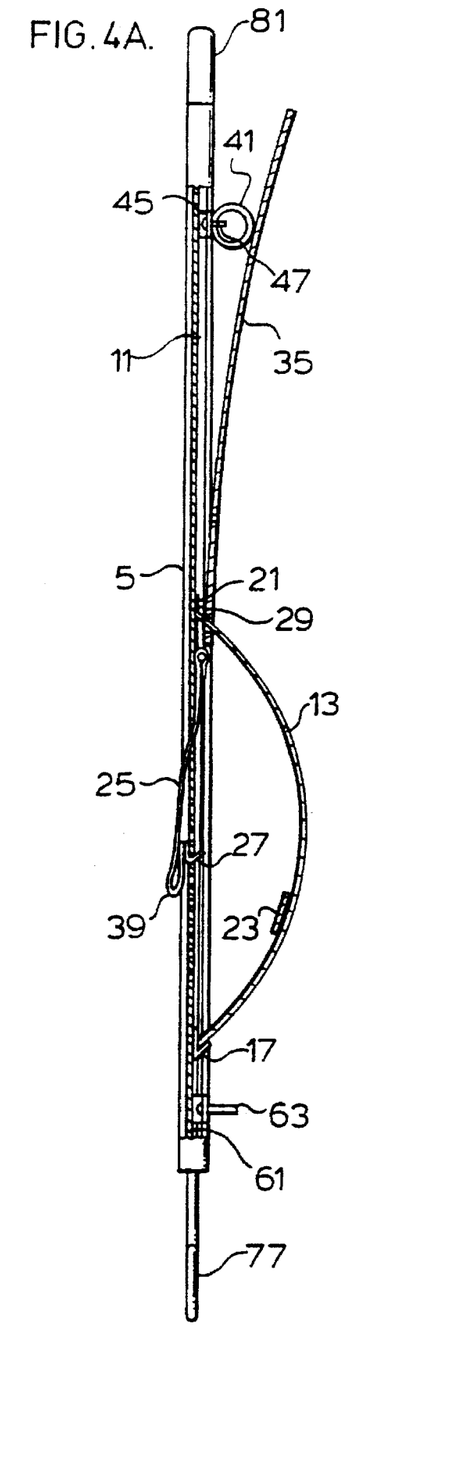
FIGS. 4A and 4B are cross sectional views along the lines IV—IV of FIG. 3 showing curvature adjustment of the lumbar support and upper back support of the backrest according to the present invention.
Figure 4B:
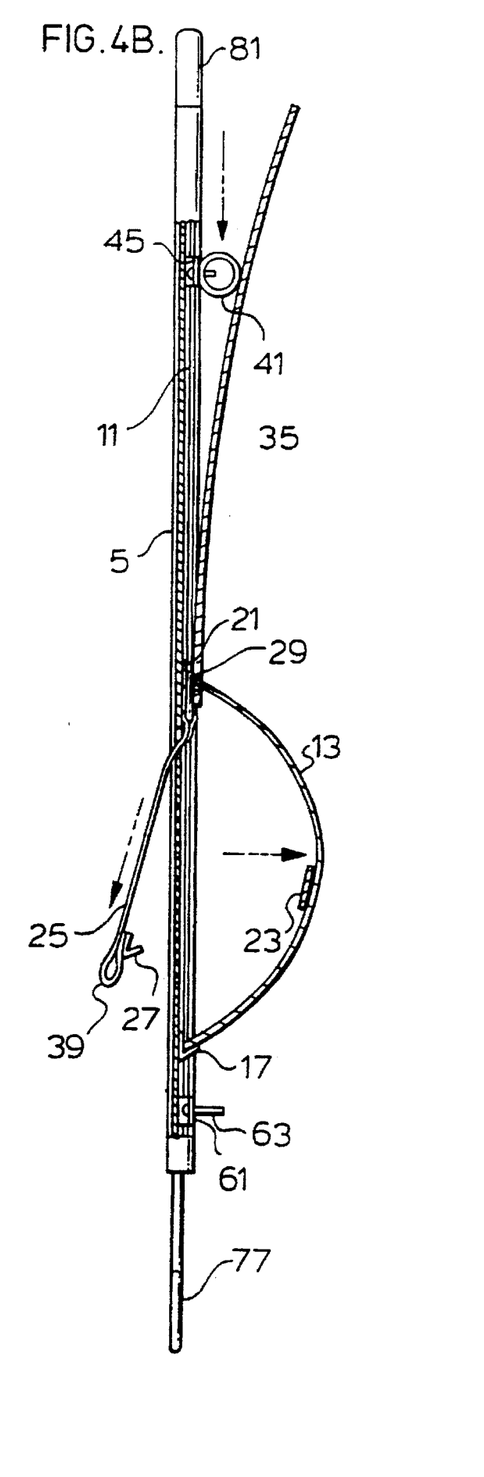

According to an important aspect of the present invention, curvature of the lumbar spring 13 may be adjusted. Turning to FIGS. 4A and 4B, the manner of such adjustment is shown. In order to adjust the curvature of spring 13, the clip 27 at the lower looped end of adjustment strap 25 is removed from one of the slots 33 in spine 5 by pulling downwardly against the tension of the spring 13 and releasing. Pulling of the adjustment strap 25 is facilitated by the loop 39 through which a finger may be inserted. Once the clip 27 has been removed from the slot 33, as shown in FIG. 4B, curvature of the lumbar spring 13 may be decreased by allowing the adjustment strap 25 to be released upwardly toward the slot 31 in spine 5. Alternatively, as shown in FIG. 4B, by pulling downwardly on the adjustment strap 25, D-ring 29 pulls the projection 21 of lumbar spring 13 downwardly, thereby increasing the curvature of the spring in the direction of the arrow.

Figure 5:
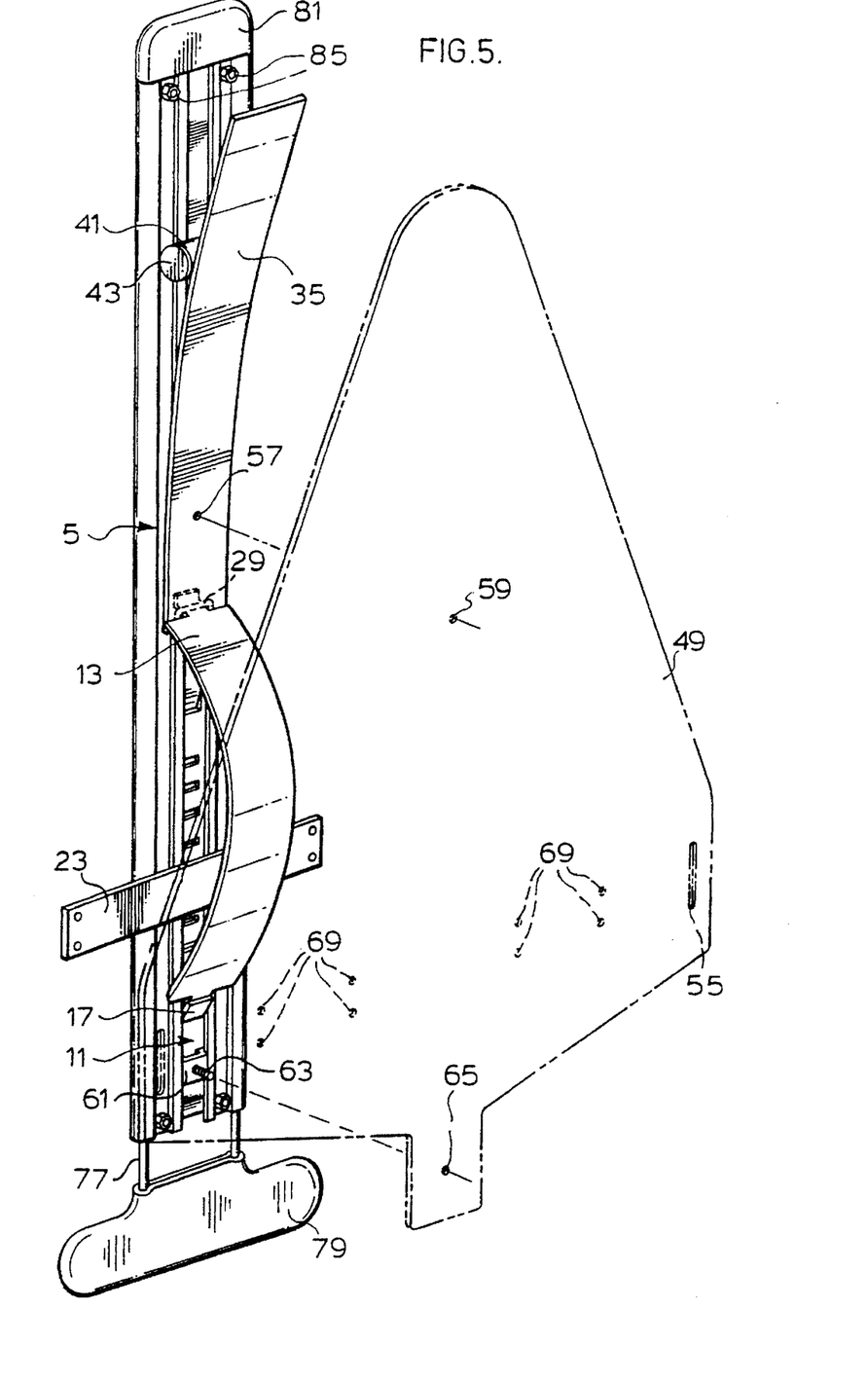
FIG. 5 is a front perspective view of the backrest according to the present invention with the back pad shown in phantom.
Figure 6:
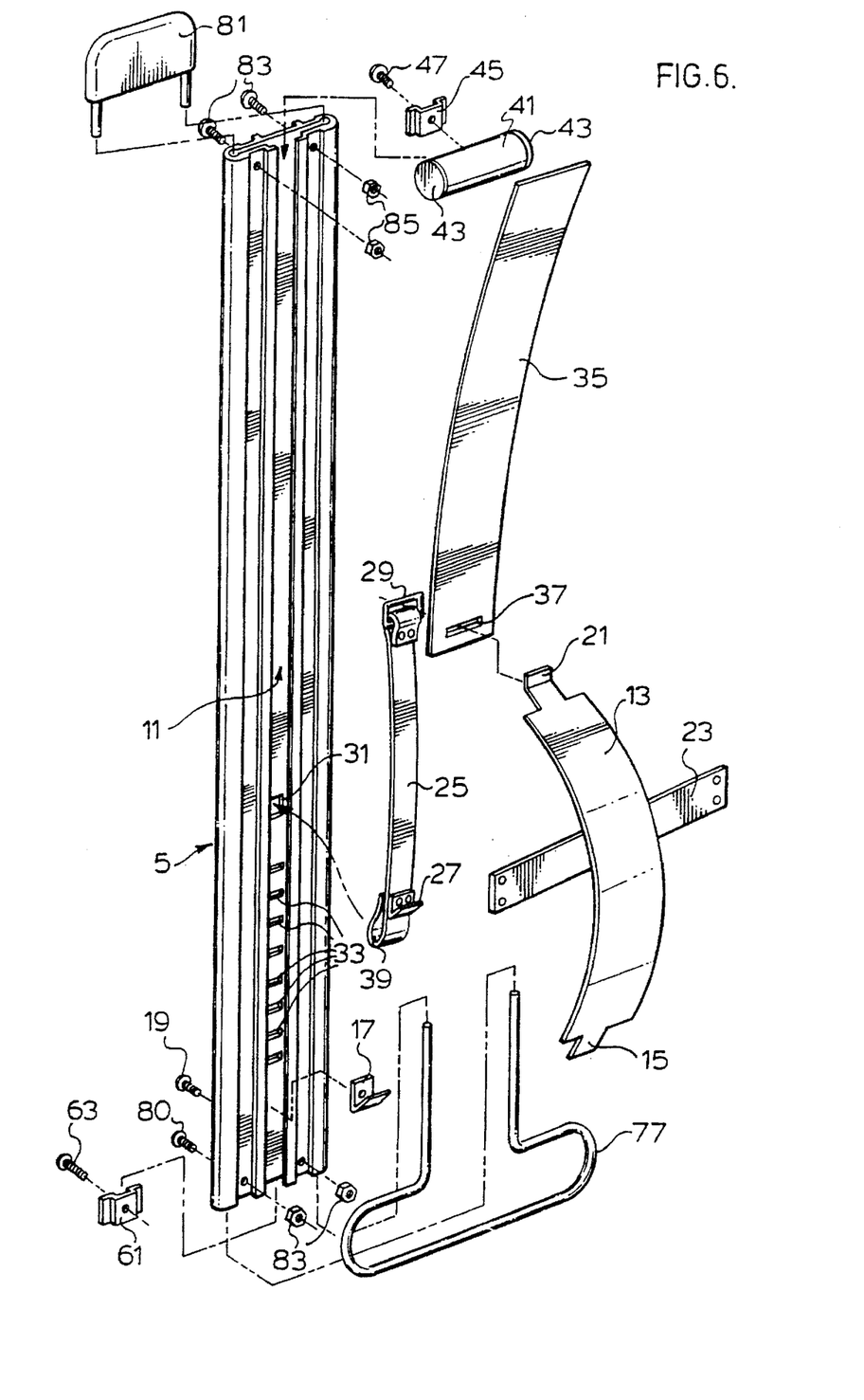
FIG. 6 is an exploded front perspective view of the structural details of the backrest according to the present invention.
Figure 7:
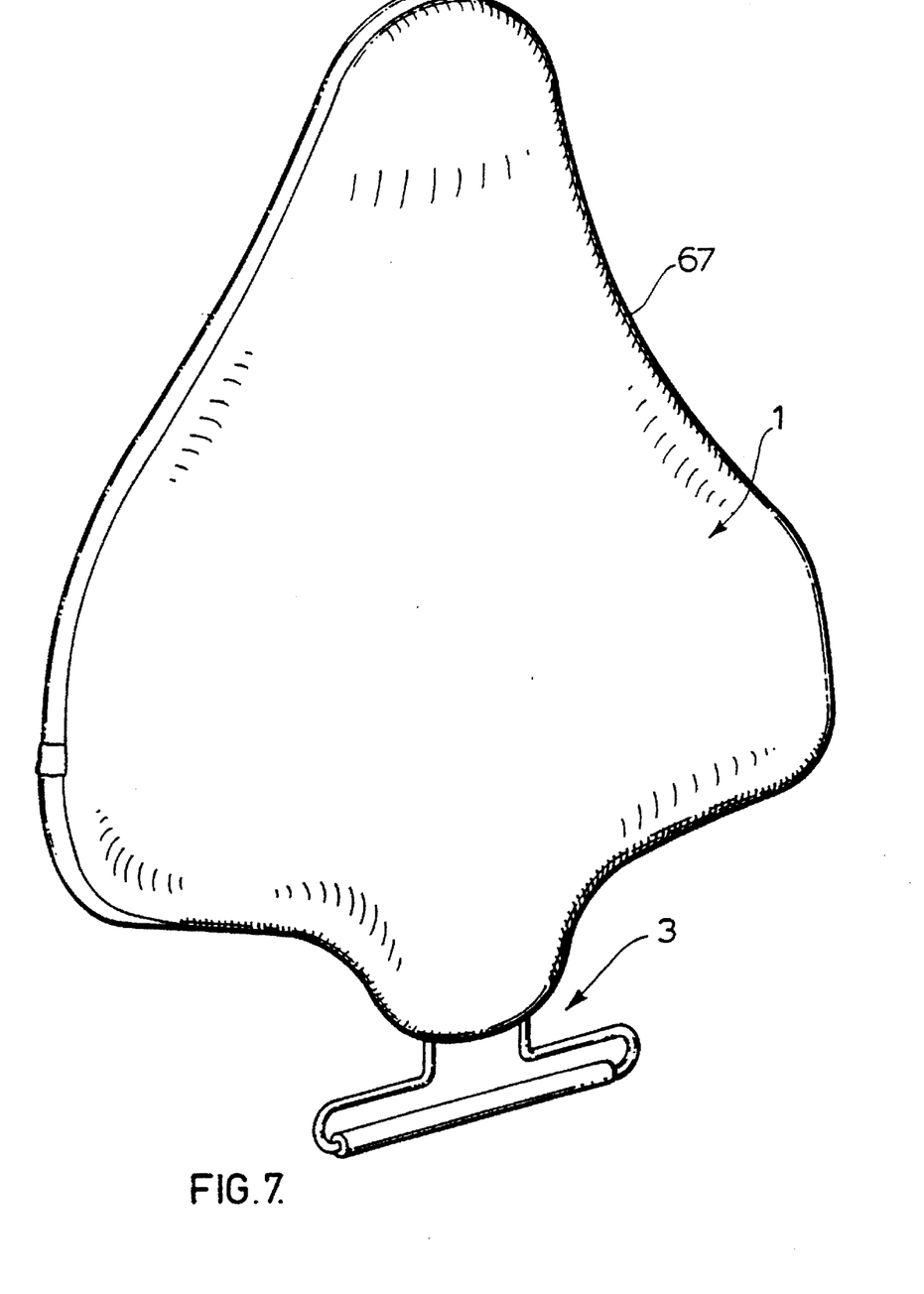
FIG. 7 is a perspective view of the backrest according to a second preferred embodiment of the present invention.
Figure 8:
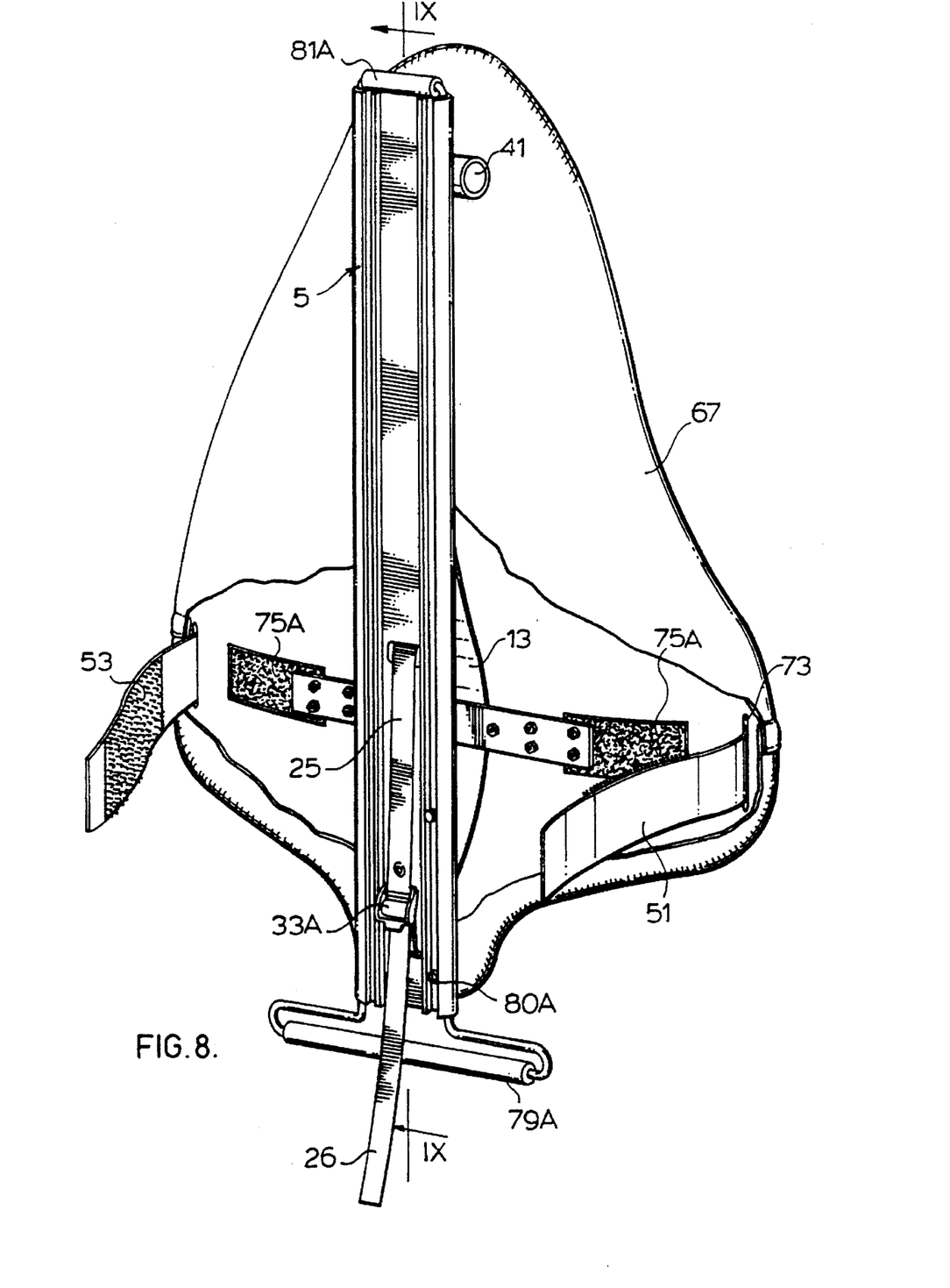
FIG. 8 is a rear perspective view, partly broken, of the backrest according to the preferred embodiment.
Figure 9A:
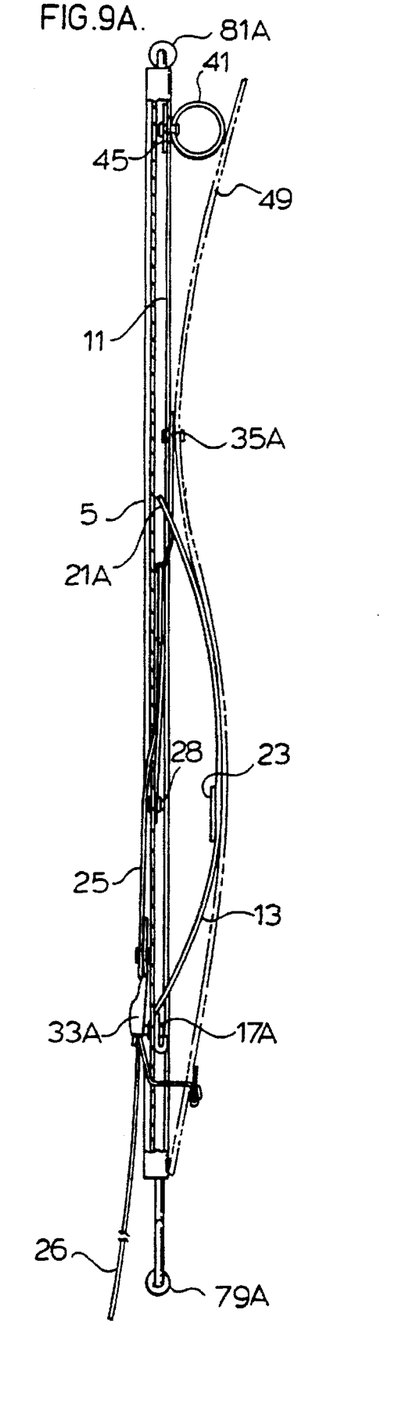
FIGS. 9A and 9B are cross sectional views along the lines IX—IX of FIG. 8 showing curvature adjustment of the lumbar support and upper back support of the backrest according to the preferred embodiment.
Figure 9B:
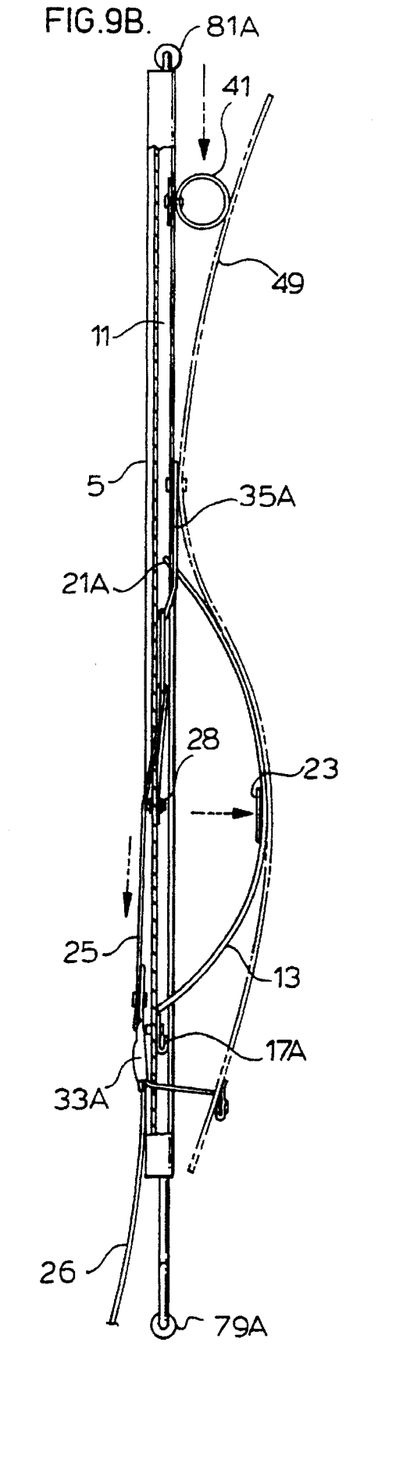
Figure 10:
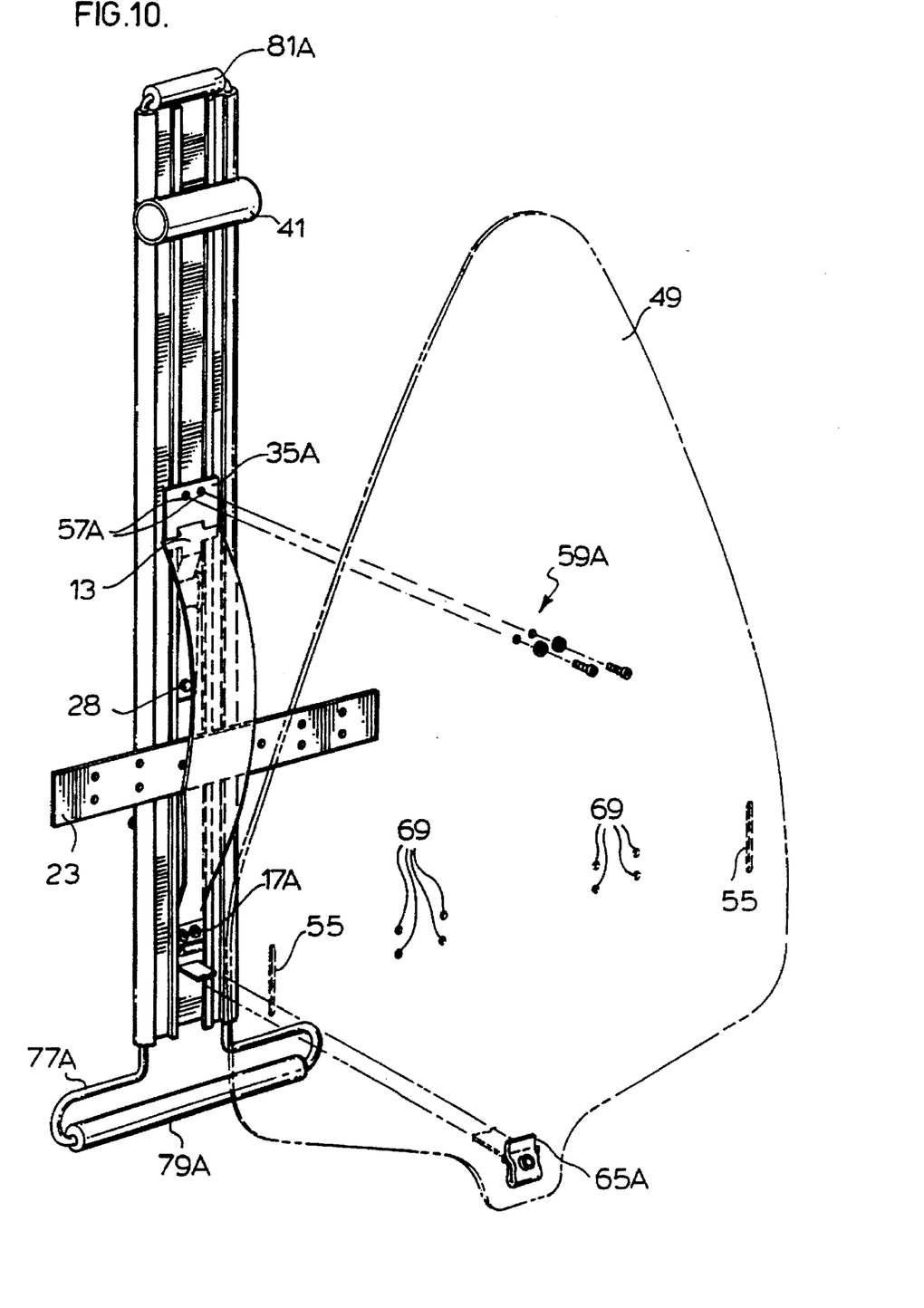
FIG. 10 is a front perspective view of the backrest according to the preferred embodiment with the back pad shown in phantom.
Figure 11:
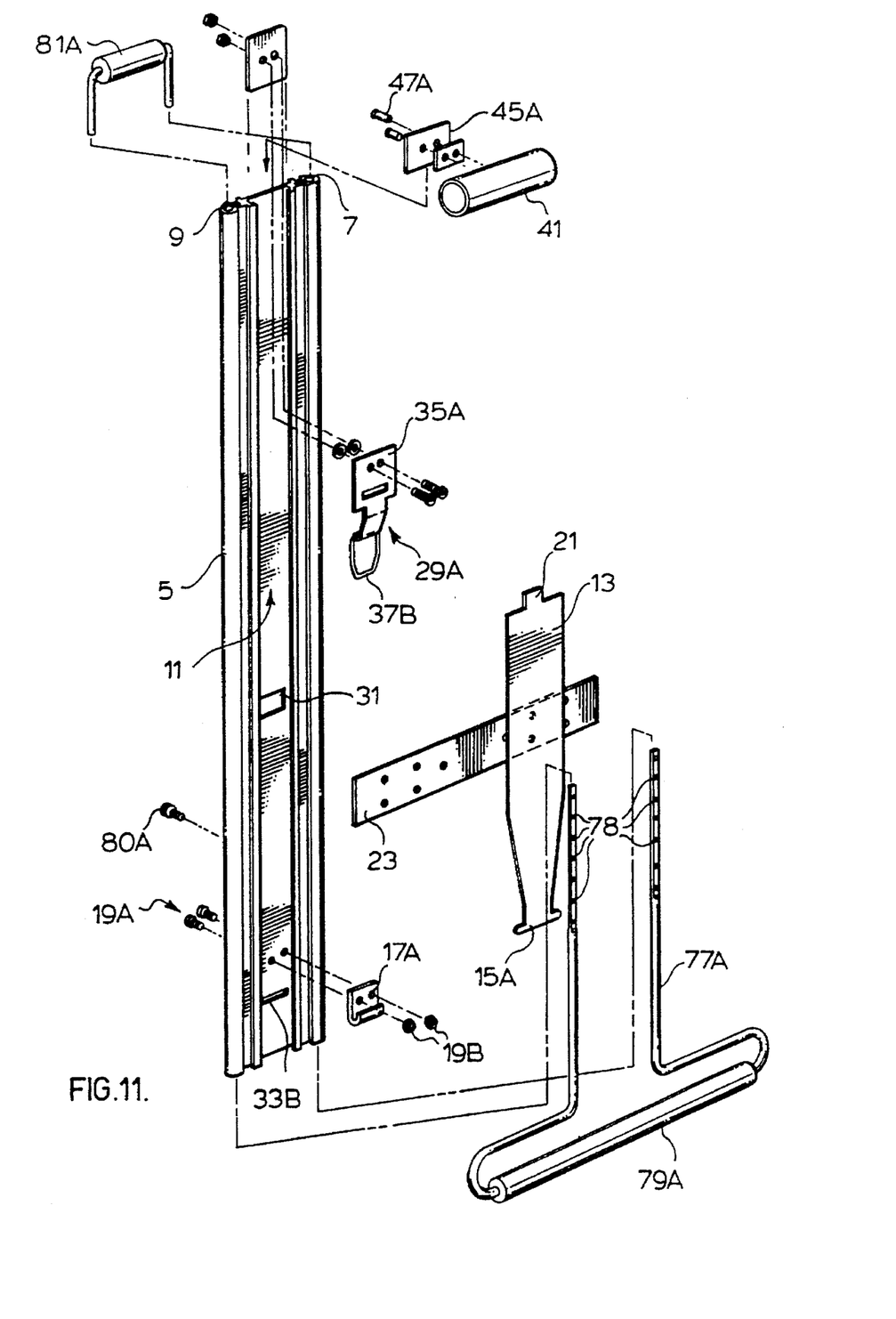
FIG. 11 is an exploded front perspective view of the structural details of the backrest according to the preferred embodiment.
Figure 12:
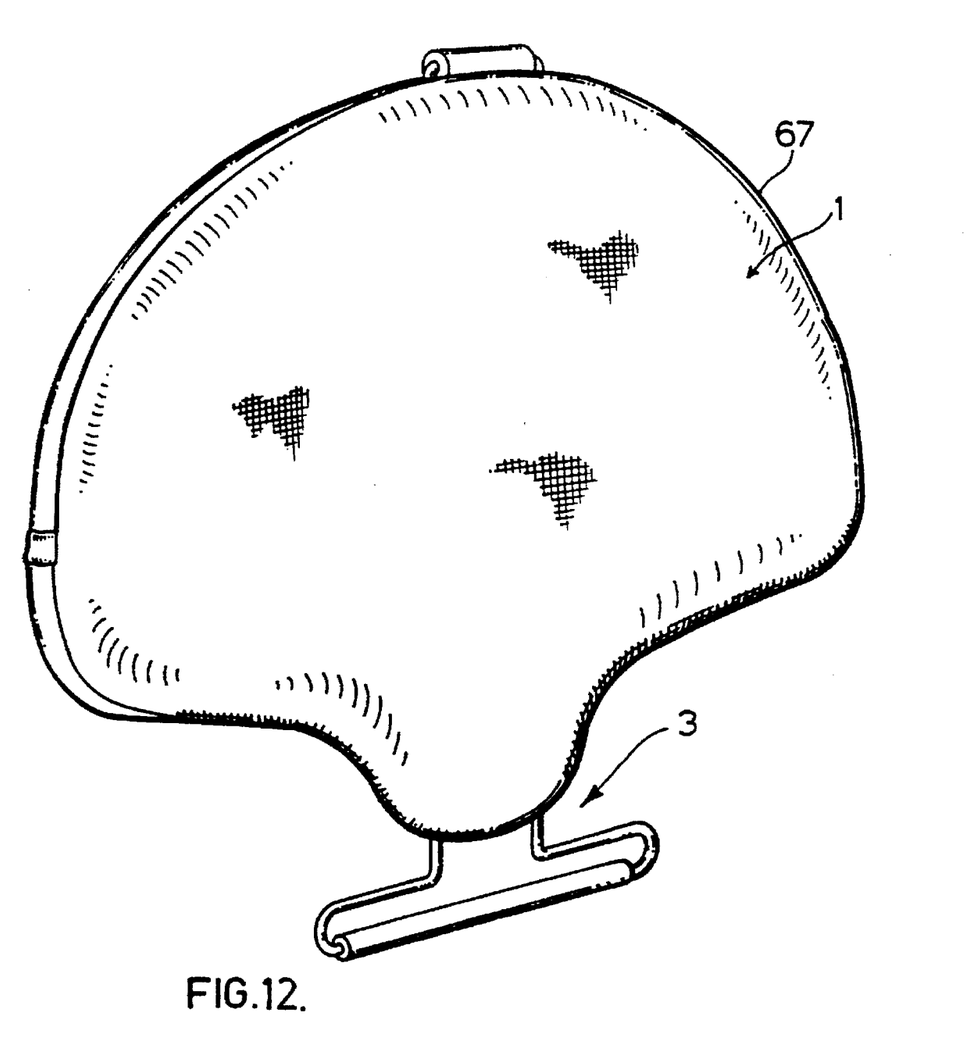
FIG. 12 is a perspective view of a lower backrest according to an alternative embodiment of the present invention.
Figure 13:
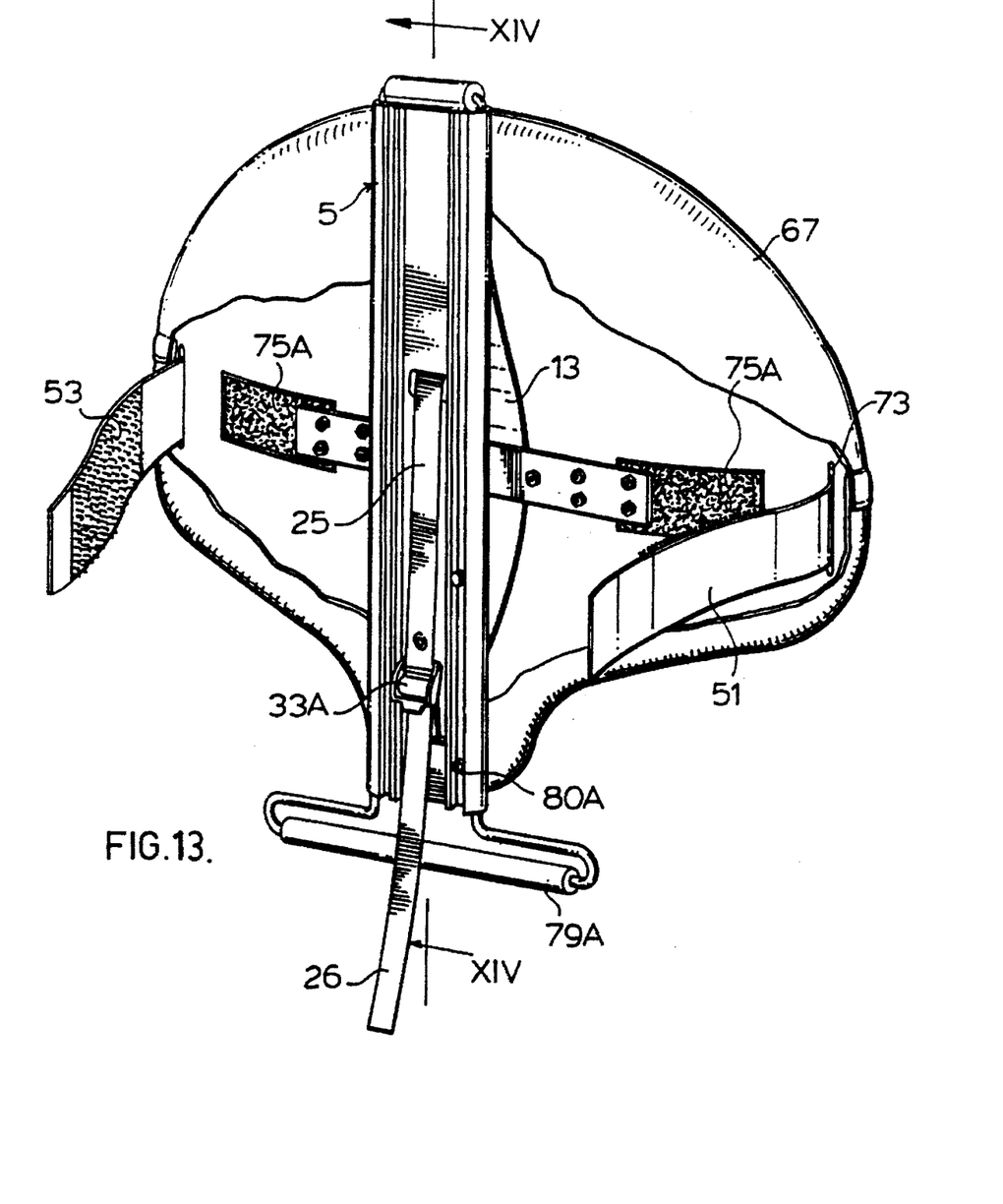
FIG. 13 is a rear perspective view, partly broken, of the lower backrest according to the alternative embodiment.
Figure 14A:
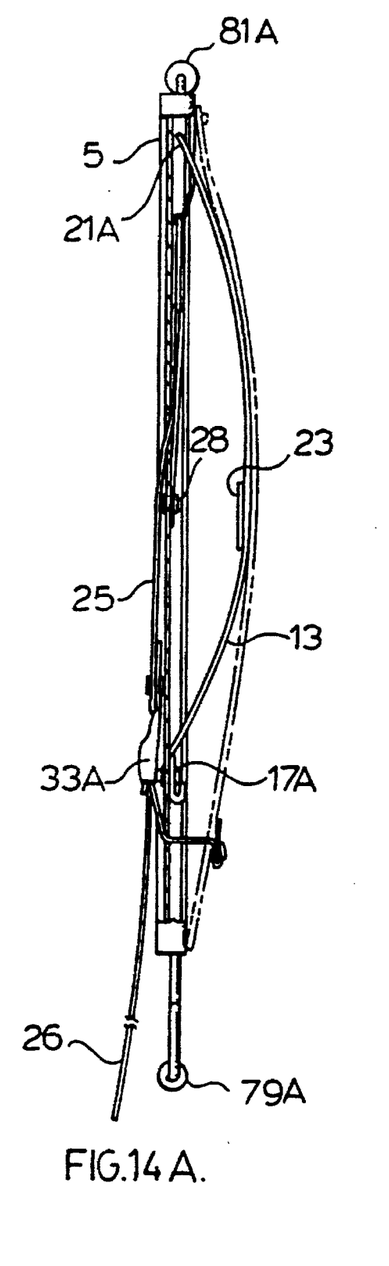
FIGS. 14A and 14B are cross sectional views along the lines IX—IX of FIG. 8 showing curvature adjustment of the lumbar support and upper back support of the lower backrest according to the alternative embodiment.
Figure 14B:
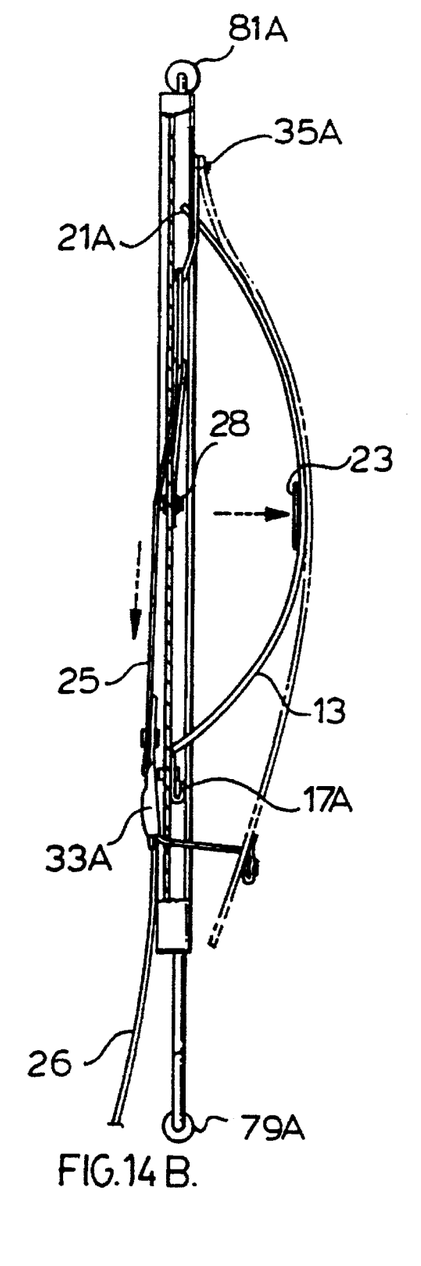
Figure 15:
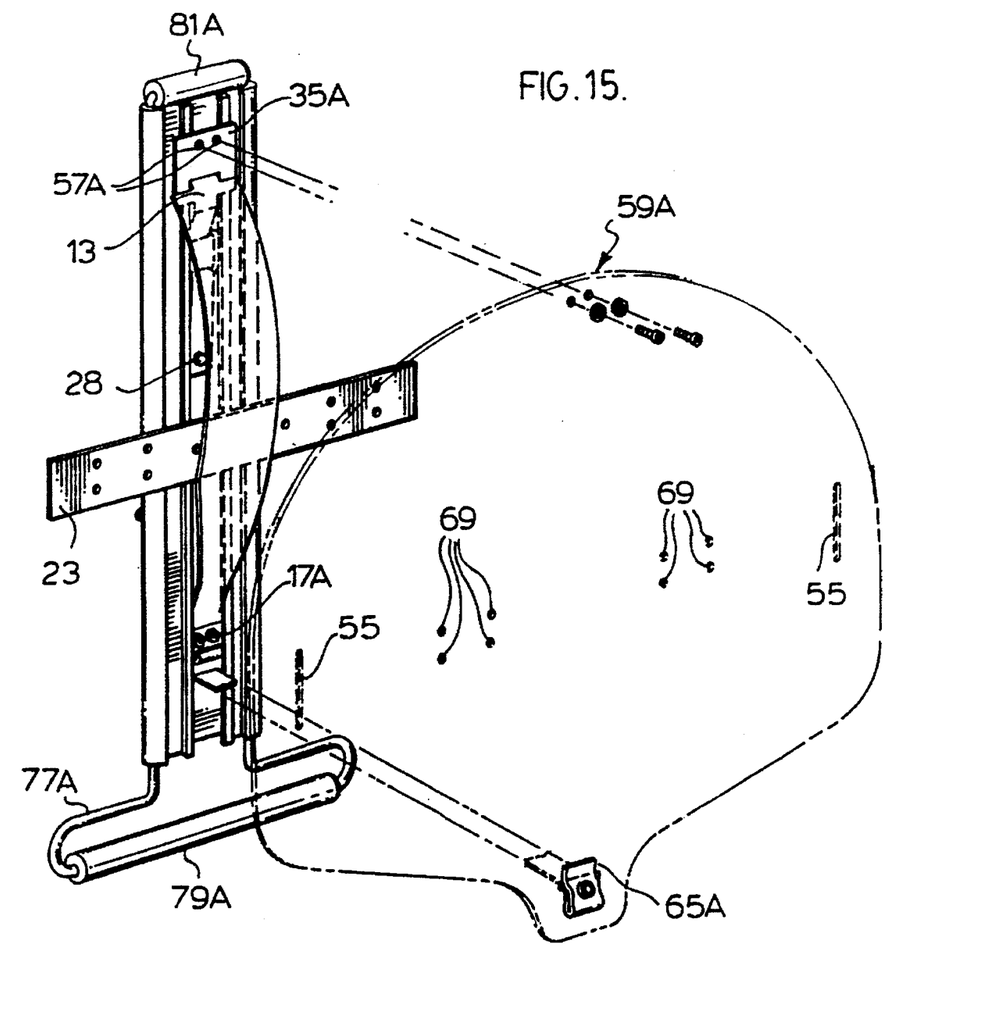
FIG. 15 is a front perspective view of the lower backrest according to the alternative embodiment with the back pad shown in phantom.
Figure 16:
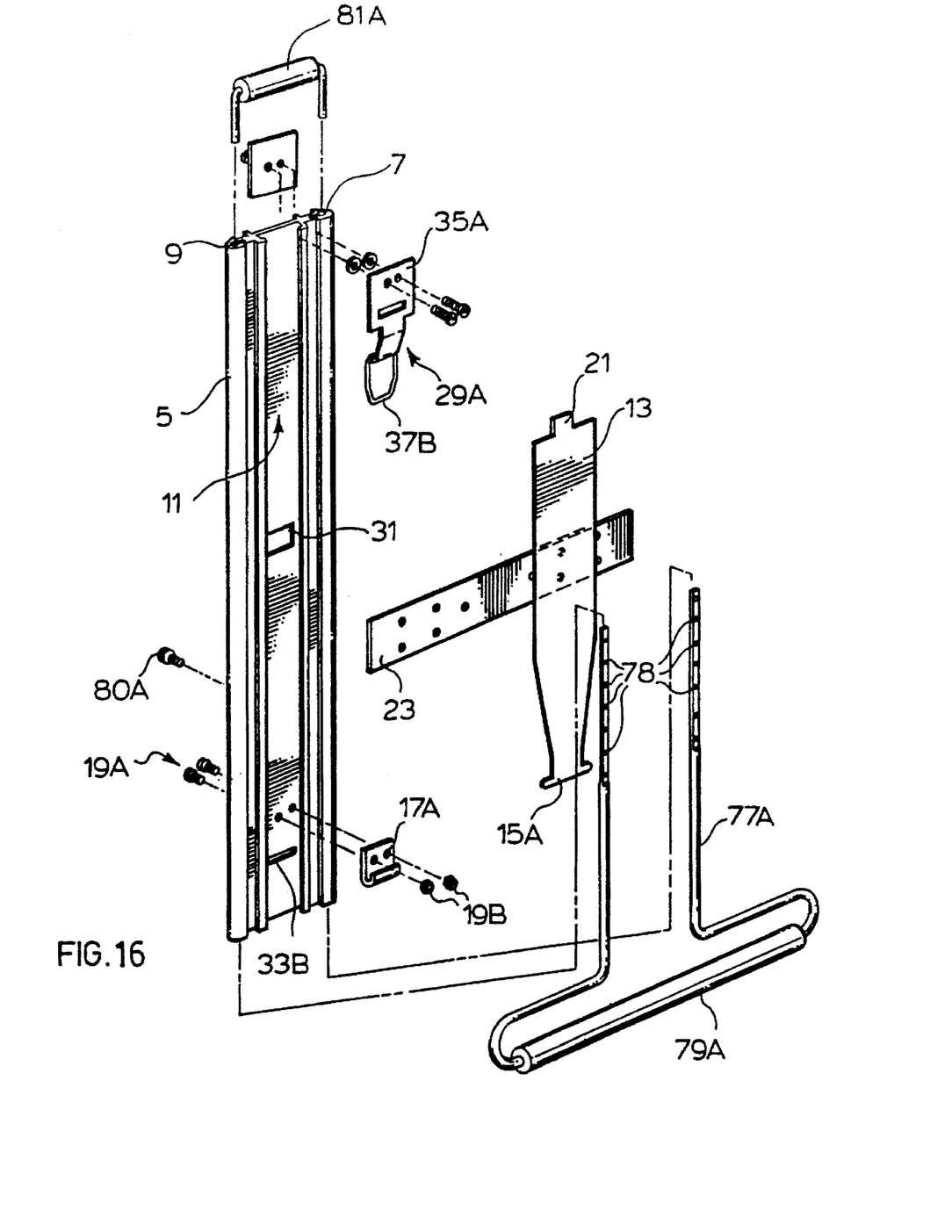
FIG. 16 is an exploded front perspective view of the structural details of the lower backrest according to the alternative embodiment.

An upper back spring 35 is provided having a slot 37 at a base portion thereof through which the projection 21 is adapted to be inserted (shown best in FIGS. 5 and 6).

According to another important aspect of the invention, independent curvature of the upper back spring 35 is also provided. A cylindrical tube 41 is capped on both sides via end caps 43, and is secured to the spine 5 via retention spring 45 which slides within the groove 11 and which is riveted to the upper back support tube 41 via rivet 47. By pushing the tube 41 downwardly in the direction of the arrow in FIG. 4B, the upper back spring 35 assumes a greater degree of curvature (ie. concavity), as illustrated. In addition, the tube 41 may be easily removed in order to remove any curvature in the upper back spring 35.

A back pad 49 (FIG. 5) is provided with a pair of adjustment straps 51 and 53 having hook and loop type fasteners thereon (i.e. velcro™) which pass through a pair of slots 55 in the back pad 49 in order to adjust the contour of back pad 49, as discussed in greater detail below. Each of these straps is independently and individually adjustable of each other allowing for precise side-to-side contouring.

The back pad 49 is connected to the upper spring 35 via a screw (not shown) or other attachment means passing through holes 57 and 59 (FIG. 5). The back pad 49 is connected at a lower end thereof to a further retention spring 61 which slides within the groove 11. Back pad 49 is connected to retention spring 61 via rivet 63 and hole 65 (FIG. 5). Thus, the back pad 49 is free to move upwardly and downwardly relative to the spine 5 as a result of the sliding connection of retention spring 61, upper back support spring 35 and cross bar 23 which is mounted to lumbar support spring 13.

Figure 2:
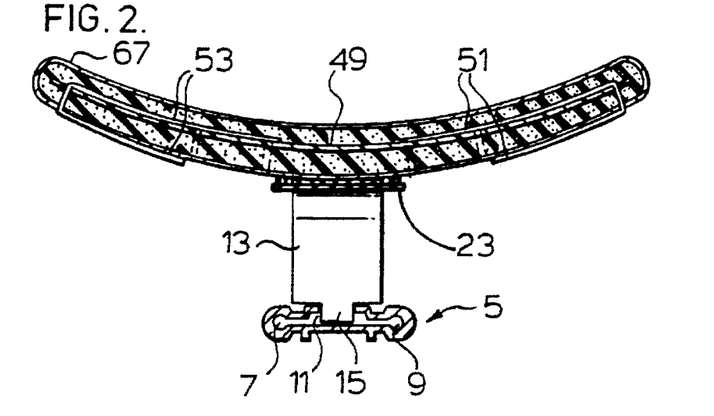
FIG. 2 is a cross section along lines II—II of FIG. 1.
Figure 3:
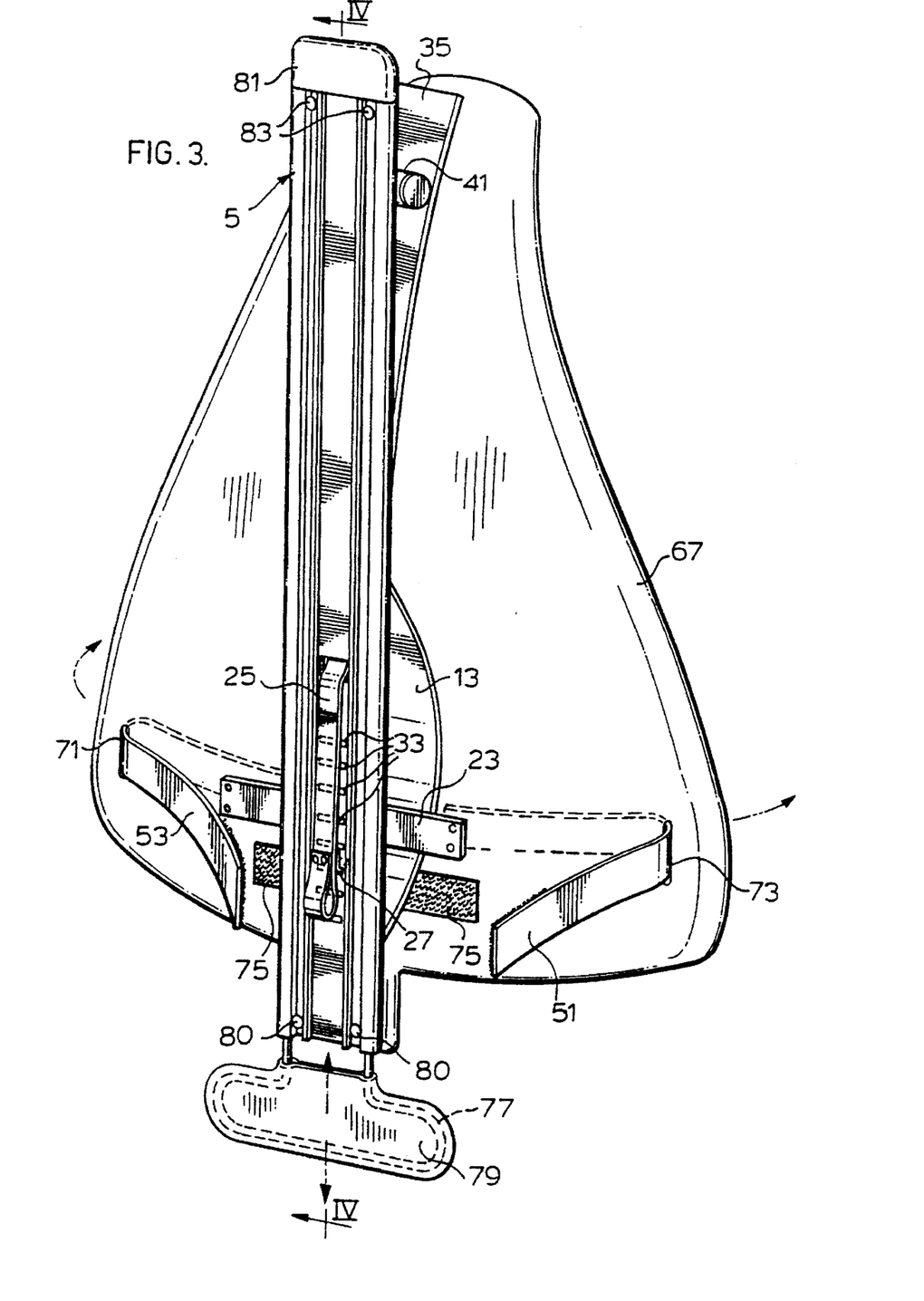
FIG. 3 is a rear perspective view of the backrest according to the present invention.

As shown in FIGS. 1, 2 and 3, the back pad 49 is covered by a suitable fabric and foam cover 67 which provides a soft cushion for receiving the human back, the overall vertical profile of the cushion being dictated by the curvatures of the lumbar support spring 13, upper back support spring 35 and back pad curvature adjustment straps 51 and 53. As shown in FIG. 3, the back pad adjustment straps are attached via rivets or other suitable means to the back pad 49 via apertures 69, and extend through the rear of the fabric and foam cushion 67 via slots 71 and 73 for connection rearwardly of the backrest to suitable hook-and-loop (i.e. Velcro™) fasteners 75 (see FIGS. 2 and 3). By pulling on the adjustment straps 51 and 53, the curvature of the back pad 49 and hence the cushion 67 covering it, is caused to increase in the direction of the arrows shown in FIG. 3.

The back pad 49 is of generally deltoid shape and preferably fabricated from plastic panel to allow free shoulder rotation and upper back twisting.

The base portion 3 of the backrest includes a wire foot 77 covered with self skinning plastic foam 79. As shown in FIG. 6, cylindrical end portions of the wire foot 77 are adapted to slide within the cylindrical holes 7 and 9 (FIG. 2) of the spine 5 for upward and downward sliding movement of the wire foot 77 as shown with reference to the arrows at the bottom of FIG. 3. The wire foot 77 is secured in place relative to spine 5, after height adjustment, by means of a pair of screws 80 and corresponding nuts 82.

A self skinning wire head 81 is inserted into the tubular grooves 7 and 9 at the top of spine 5 to provide a pleasing aesthetic finish and an integral carrying handle. The wire head 81 is secured within spine 5 via a pair of screws 83 and corresponding nuts 85 which cause the grooves 7 and 9 to close around the wire head 81. In order to assemble the backrest according to the present invention, cross bar 23 is first attached to the lumbar spring 13 using very high bond tape, or other suitable material, as discussed above. The Velcro™ adjustment straps 51 and 53 and the cross bar 23 are then riveted to back pad 49. Lumbar spring 13 and upper back spring 35 are hooked together as shown in FIG. 6, and the upper back spring 35 is riveted to the back pad 49 as discussed with reference to FIG. 5. The retention spring 61 is riveted to the back pad 49 through hole 65 (FIG. 5). Clip 27 is then riveted to the lumbar adjustment strap 25, forming a loop 39.

Wire foot 77 is inserted into the spine 5 and fastened into place with machine screws 80 and nuts 82. Loop 29 is hooked to the lumbar spring 13 and this assembly is then made to slide into the channel 11 in the spine 5. The lumbar adjustment strap 25 is then inserted through the D-shaped loop and riveted to the end thereof, and the opposite looped end 39 of the strap 25 is pushed through slot 31 at the back of the spine 5. The assembly comprising lumbar spring 13, D-shaped loop 29 and upper back spring 35 is pulled downwardly to allow the retention spring 61 to slide into the spine 5 from the bottom. The assembly is then pulled back up and the bottom end 15 of the lumbar spring 13 is hooked into clip 17.

Next, the retention spring 45 is riveted to the upper back support tube 41. End Caps 43 are inserted into the sides of the upper back support tube 41, and the assembly comprising the upper back support spring 35 and retention spring 45 are inserted into the channel 11 of spine 5 from the top.

The wire head 81 is then inserted into the top of the spine 5, the fabric and foam cover 67 is placed over the back pad 49, and the various straps 25, 51 and 53 are adjusted for personal setting.

The preferred embodiment of the invention is illustrated in FIGS. 7–11. The preferred embodiment is similar in many respects to the embodiment shown in FIGS. 1–6. Where the features are identical, no additional description is provided herein, and the same reference numerals have been used in FIGS. 1–6 and FIGS. 7–11 to identify like components.

In the preferred embodiment, the wire head 81A is provided with a rubberized sleeve for enveloping the protruding top portion of the wire head, rather than completely encapsulating the wire head 81 as in the embodiment in FIG. 1–6.

The spine 5 is of slightly modified design in that cylindrical channels into which the ends of the wire head 81A are inserted, have been extruded directly into the spine, thereby eliminating the requirement for screws 83 and nuts 85 (FIGS. 1–6).

In the preferred embodiment, spring 35A has been shortened and the material from which it is fabricated (eg. plastic) is strengthened relative to the spring 35 in the embodiment of FIGS. 1–6, so as to provide the same level of resiliency as in the embodiment of FIGS. 1–6.

The back pad 49 is connected to anchoring spring 35A via a pair of nuts and bolts (FIG. 10) which pass through a pair of holes 59A in back pad 49 and a pair of holes 57A in spring 35A, thereby replacing the single holes 57 and 59 in the embodiment of FIGS. 1–6.

The method of securing the lumbar spring 13 for a predetermined amount of curvature is substantially modified in the embodiment of FIGS. 7–11, resulting in the elimination of slots 33. In the preferred embodiment, one end of a first adjustment strap 25 is connected to the spine 5 via a rivet 28 and the other end is connected to a friction buckle 33A. The strap 25 passes upwardly from buckle 33A along the rear side of the spine 5, through aperture 31 in the spine, through loop 37B of spring 35A, and down to the rivet 28. One end of a second adjustment strap 26 is connected at 65A to a bottom portion of back pad 49, passes through slot 33B and is then threaded through friction buckle 33A, for permitting adjustment and then tightening of the strap 26 in position. The end of strap 26 which is connected to the back pad 49 at 65A is folded back on itself, and is rivetted for securing the end of the strap to the back pad. The use of a buckle (e.g. LADDER LOCK™) provides easier and finer adjustment of the lumbar spring 13 and upper spring 35A than is provided with the hook and slot arrangement in the embodiment of FIGS. 1–6.

Since the lower portion of back pad 49 is secured via strap 26, the retention spring 61 and rivet 63 have been eliminated from the preferred embodiment.

In the preferred embodiment, hook-and-loop fasteners 75A are attached directly to the cross-bar 23, rather than to the foam backrest.

The position adjustment of wire foot 77A is simplified in the preferred embodiment by replacing the two screws 80 (FIGS. 3 and 6), with a single thumb screw 80A which projects into the channel 9 for insertion into one of the circular apertures 78 in wire foot 77A, thereby locking the wire foot in position.

The plastic foam 79 of the embodiment shown in FIGS. 1–6 is replaced in the preferred embodiment by a rubber sleeve 79A, in a similar manner as discussed above with reference to wire head 81A.

The cross bar 23 is more securely fastened in the preferred embodiment via a plurality of nuts and bolts (not shown), wherein the bolts are inserted through ten holes 69 extending through the back pad 49 and corresponding holes through cross bar 23, instead of four holes in the embodiment of FIGS. 1–6.

The screw 47 (FIGS. 4A, 4B and 6) is replaced in the preferred embodiment by a rivet 47A, while the retention spring 45 is replaced by a flat member 45A having a pair of holes.

In the preferred embodiment, the end 21 of lumbar spring 13 is no longer bent and the overall shape of the lumbar spring differs from that in the embodiment of FIGS. 1–6. Furthermore, the method of attaching the lumbar spring 13 to spring member 35A is modified from the embodiment of FIGS. 1–6, as shown best with reference to FIGS. 9A, 9B and 10. Specifically, the upper end 21 of lumbar spring 13 is inserted through slot 37A in spring 35A, while the opposite end 15A rests in clip 17A. The clip 17A is secured to the spine 5 via nuts 19B and bolts 19A.

In operation, by pulling downwardly on strap 26, buckle 33A is pulled downwardly which, in turn, causes strap 25 to pull down spring member 35A via loop 37B. This causes the lumbar spring 13 to flex, thereby increasing the curvature thereof.

Although specific design features are changed in the preferred embodiment over the embodiment shown in FIGS. 1–6, the general principle of operation remains the same.

In summary, according to the preferred embodiment of the present invention, an adjustable backrest is provided having independent lumbar height and depth adjustment, overall height adjustment to fit different sized patients, mid-back curve height adjustment, side adjustment to suit each half of a patient's back, upper back side-to-side mobility so that the patient can turn from side-to-side, and a hollow portion just above the base to allow curvature and room so that the backrest of the present invention does not occupy excessive space on the chair. Furthermore, the backrest according to the preferred embodiment is portable, and can be affixed to office chairs, car seats, wheelchairs, etc. or can be made an integral part thereof.

Other embodiments and modifications of the invention are contemplated. A lower backrest alternative embodiment is shown in FIGS. 13 to 16. In this alternative embodiment, rather than being generally deltoid in shape, the back pad is characterized by an arcuate upper edge for providing free shoulder rotation and upper back twisting. No upper back support is provided in this alternative embodiment. Apart from the elimination of upper back support and the provision of a rounded upper edge of the back pad, the construction of this alternative embodiment is identical to that of the preferred embodiment and the same reference numerals have been used in FIGS. 12–16 and FIGS. 7–11 to identify like components.

In a further alternative embodiment the backrest of the present invention may be incorporated integrally within a chair, rather than being portable as provided in the preferred embodiment. This further alternative embodiment nonetheless offers all of the advantages of independent adjustability provided by the preferred embodiment.

These and all other modifications and embodiments are believed to be within the sphere and scope of the invention as defined by the claims appended hereto.

We claim:

1. An adjustable backrest for supporting a human back comprising:
   a) a spine member;
   b) a lumbar support member projecting from said spine member;
   c) a back pad resting on said lumbar support member for supporting the lumbar portion of said human back;
   d) lumbar adjustment means connected to said lumbar support member for adjusting curvature of said lumbar support member to accommodate different sizes and shapes of said lumbar portion of said human back; and
   e) length adjustment means for adjusting length of said spine member to accommodate different lengths of said human back.

2. The adjustable backrest of claim 1, wherein said length adjustment means further comprises a foot portion connected to a base portion of said spine member for adjustable sliding movement with respect thereto.

3. The adjustable backrest of claim 1, wherein said lumbar support member further comprises a generally convex spring connected to said spine member.

4. The adjustable backrest of claim 3, wherein said generally convex spring is connected at one end to said spine member and secured at an opposite end to a spring member for sliding movement relative to said spine member.

5. The adjustable backrest of claim 4, wherein said lumbar adjustment means further comprises a first adjustment strap connected at one end to said spine member and at an opposite end to a friction buckle, wherein said first adjustment strap passes upwardly from said buckle along a rear surface of said spine member, through an aperture in said spine member, through a loop portion of said spring member, and therefrom to said spine member, and a second adjustment strap connected at one end to a bottom portion of said back pad, through a slot in said spine member and therefrom through said friction buckle, for permitting adjustment and then tightening of said second adjustment strap in position.

6. The adjustable backrest of claim 1, further comprising a cross bar connected to a central portion of said lumbar support member, said cross bar having a pair of opposite wing portions extending perpendicular to said spine member.

7. The adjustable backrest of claim 6, wherein said back pad is connected to said cross bar.

8. The adjustable backrest of claim 7, wherein said back pad further includes a pair of individually adjustable side support members and a pair of adjustment straps each connected at one end to respective ones of said wing portions, said pair of adjustment straps passing through respective apertures in said back pad, and free ends of each of said adjustment straps being connectable to respective hook and loop type fasteners on an opposite side of said back pad, whereby curvature of said back pad may be adjusted by adjusting the length of said pair of adjustment straps.

9. The adjustable backrest of claim 1, wherein said back pad is covered by resilient foam.

10. The adjustable backrest of claim 1, wherein said back pad is preferably a plastic panel having an arcuate upper edge for providing free shoulder rotation and upper back twisting.

* * * * *